W. C. CORNWELL.
PICTORIAL REPRESENTATION AND METHOD OF PRODUCING THE SAME.
APPLICATION FILED APR. 13, 1916.

1,232,228.

Patented July 3, 1917.
2 SHEETS—SHEET 1.

WITNESS

INVENTOR :
William C. Cornwell
By Attorneys,
Fraser, Turk & Myers

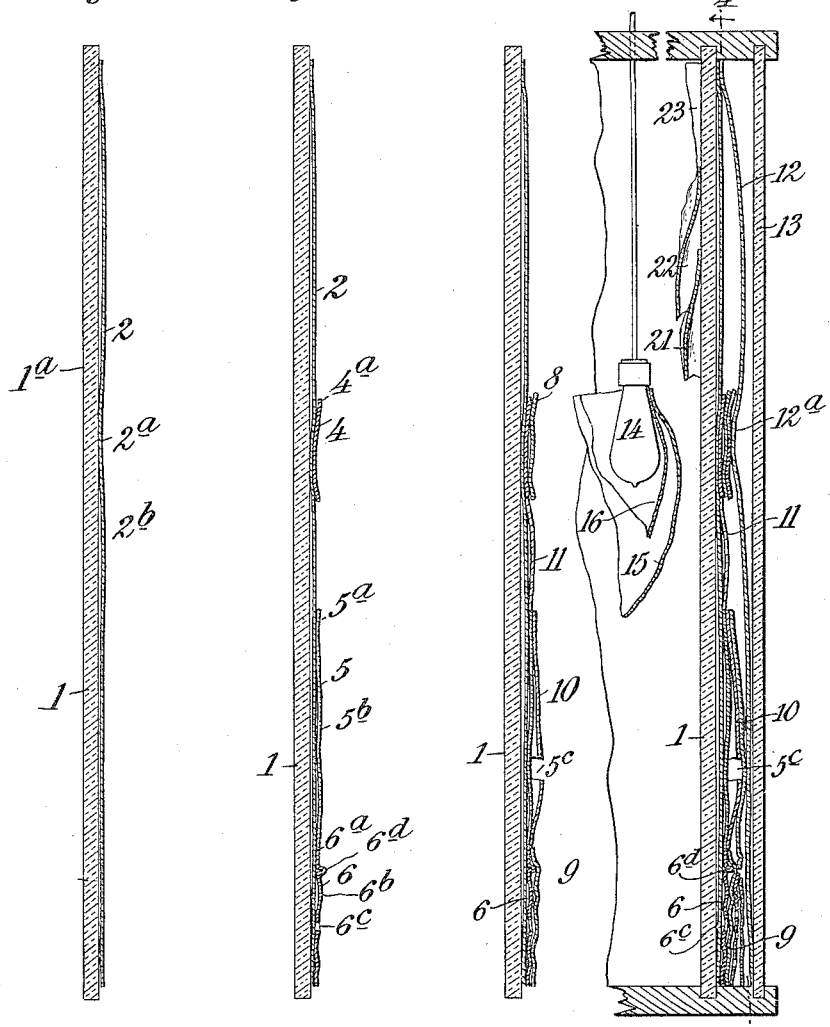

UNITED STATES PATENT OFFICE.

WILLIAM C. CORNWELL, OF NEW YORK, N. Y.

PICTORIAL REPRESENTATION AND METHOD OF PRODUCING THE SAME.

1,232,228.   Specification of Letters Patent.   Patented July 3, 1917.

Application filed April 13, 1916. Serial No. 90,817.

*To all whom it may concern:*

Be it known that I, WILLIAM C. CORNWELL, a citizen of the United States of America, residing in the city of New York, in the borough of Manhattan, county and State of New York, have invented certain new and useful Improvements in Pictorial Representations and the Method of Producing the Same, of which the following is a specification.

This invention relates to pictures which, for want of a better term, I have called luminos, the object of the invention being not only to produce all the effects that can be produced by the skilled artist with paints upon canvas, but also to impart to the picture the element of actual light and actual shade in contradistinction from the conventional representation of those employed in paintings. The basis of the invention is the utilization of light itself, there being interposed between the source of light and the eye means for coloring, blending, obstructing and permitting to pass the natural light so that the forms, outlines, colors, lights and shadows of the subject are depicted when the lumino is viewed against the light.

The painter with pigments endeavors to represent color, form and light. He paints the light in or tries to produce the effect of light to the eye. My process builds up and models form and color only, the light being real and so produces a hundred times greater beauty in the completed picture, than could be possibly accomplished by the ordinary methods of painting.

Figure 2:
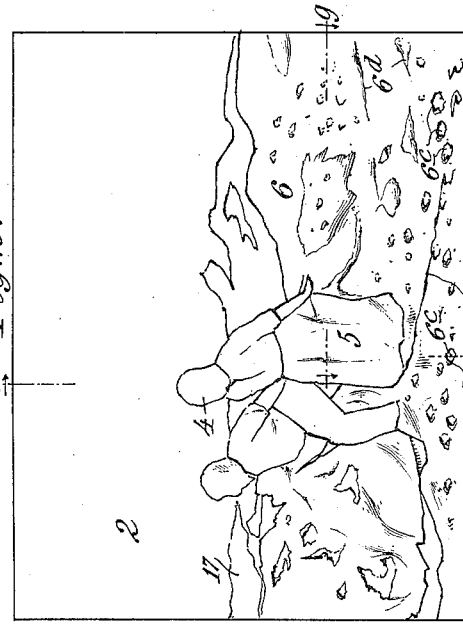
Figure 4:
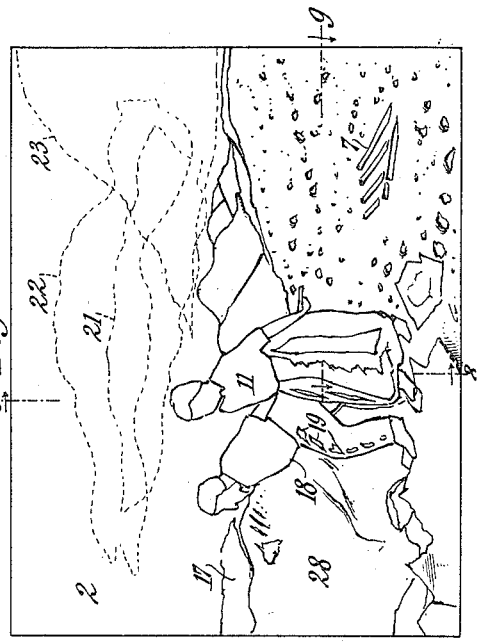
Figure 1:
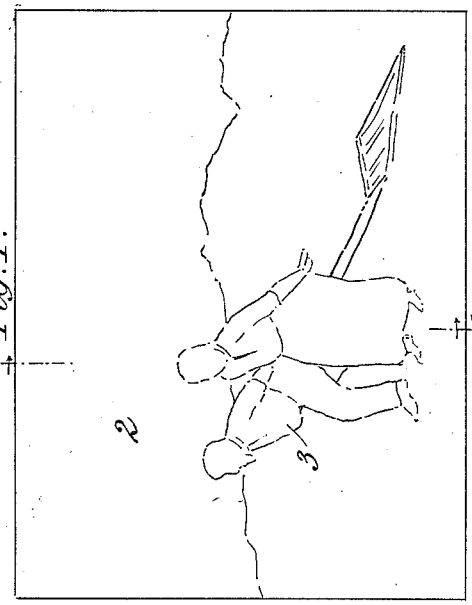
Figure 3:
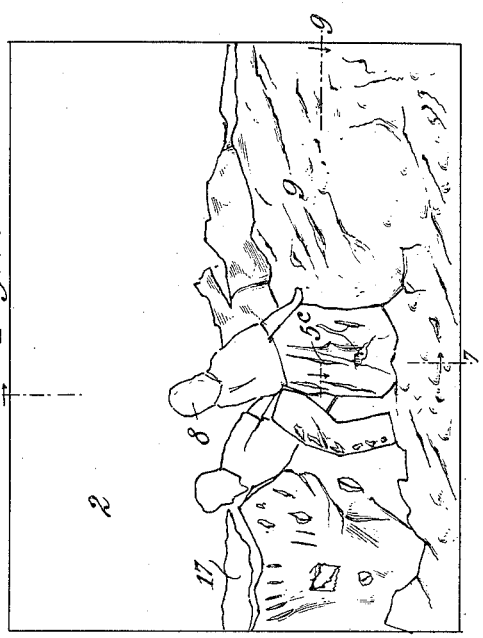

The accompanying drawing is for the purpose of illustrating my invention so far as the mechanical draftsman can depict in his pen and ink drawing, an object of art foreign to his craft, in which drawing:

Figures 1, 2 and 3 represent a picture which is building. Fig. 4 represents a completed picture. Figs. 5, 6, 7 and 8 are cross-sections through the representations of Figs. 1, 2, 3 and 4 respectively, taken at about the plane indicated by the dotted line. Fig. 8 also including by way of illustration a source of colored illumination, and Fig. 9 is a longitudinal section of Fig. 4, taken at about the plane of the line 9 of such figure.

In producing pictures or luminos according to my invention, I preferably employ a support upon which to apply the various elements and build the picture. The support in practice is a body through which the rays of light may pass, it may be transparent, but at any rate must be pervious to the rays of light. This support in the illustration is designated by the reference character 1. I then model and apply to the support colored translucent material in superimposed layers and masses varying in color, size, thickness, form, outline and density, to modify the light, when viewed against the light, and represent the form, outline, color, lights and shadows of the subject depicted. Paper lends itself most admirably to the building up of these pictures. The material, as it is piled up, spread out, and massed together, serves to obstruct portions of the light rays in such manner that there is produced upon the eye the impression of not only a picture, but a picture which is alive.

The picture indicated by the drawing is a primitive agricultural scene and is built up substantially in the following manner:—

The body portion, or support, is represented as a sheet of glass, which may be mounted in some suitable support or frame for ease in handling during the building up and for convenience and security in display after completion. There is shown applied over this a thin sheet of light transparent material 2 which furnishes a portion of the general background for giving tints to the scene, which, in the present illustration, is a picture with the sun at the horizon. To assist in the proper coloring effect, the initial sheet of transparent material 2 is light blue in the present illustration, and may be applied to either side of the glass or support. In the illustration it is applied to that side which is toward the observer of the completed picture and which side receives the most of the building material. In practice, the artist frequently finds it desirable to temporarily outline certain portions of the picture upon the otherwise exposed portion or side 1ª of the glass. The direction of view in Fig. 1 is from the right-hand side of Fig. 5, and the figures, etc. 3 are seen through the first sheet of paper 2 and the glass. This outline may remain as a permanent part of the picture, but is preferably expunged after serving its purpose of a guide. In Figs. 2 and 6, pieces of paper are applied. These are of suitable color and thickness for producing the desired effect. A piece of substantial white paper 4 is applied for the background for the woman's head, this being in line with the plane of cross-section. Another piece of paper of darker blue than the background is applied at 5 and constitutes a part of the woman's skirt. Yellow paper is applied at 6 to furnish a backing for the plowed earth over which the man and the woman are represented to be drawing a harrow 7, seen in Fig. 4. It is to be noted that the portions of paper thus described are not pasted or placed flat against the glass support; in fact, the non-adherence or wavy effect is desirable. In the first instance, the sheet 2, which is represented as covering the entire glass, touches it in places,—as for instance at $2^a$, and is out of contact with it in other places,—as for instance at $2^b$. The edges $4^a$ of the foundation for the head are also shown out of contact with the sheet to which it is secured. The same thing is true of the skirt forming piece of paper which is in engagement with the sheet 2 at $5^a$ and out of engagement therewith in other places,—as for instance at $5^b$. The obstruction of the light rays and permitting more or less passage of various colored rays, is controlled by the amount of material interposed between the eye of the person viewing the picture and the source of light. It is quite obvious that the effect of the waves in the paper is within the control of the artist. The broken, roughly plowed ground which is being harrowed, shows a series of depressions and unbroken earth, the necessary lights and shadows for which are produced by not only the wavy effect of secured and partly secured portions of the papers building it,—as for instance the portions $6^a$ and $6^b$ respectively of the yellow paper 6; but also by openings or ruptures $6^c$ in such paper and by crumpling up and massing the paper together,—as for instance at $6^d$. In Figs. 3 and 7 an additional face forming paper 8 of yellow is applied and the skirt forming sheet 5 is roughly torn, as at $5^c$. Some of these tears are made in the portions pasted tightly against the glass and some of these tears are made in the portions which bulge away from the glass. The different light effects produced by such a cut or tear in these portions is quite obvious. Sometimes the tearing is more in the nature of molding the wet paper and paste with which it is attached to its support,—for instance the molding illustrated in the yellow ground work 6 is produced by some sharp instrument scraping the paper up and massing it together. These are illustrated particularly in Fig. 2 at $6^e$. A piece of darker yellow paper 9 is shown pasted over the yellow sheet 6. The paper in places is crumpled up at the time of applying. Some portions, as in the other instances, move away from the underlying sheet and in some places adhere closely to it. An additional skirt portion 10 is also illustrated. In Figs. 4 and 8, as will be seen portions of the face are indicated. The harrow 7 above referred to is partly produced by slits in the paper and partly by obstructions to the passage of the light thus making the wooden frame and the contrasting teeth. In Fig. 4, as will be seen a sheet of white paper 11 is added for forming the waist of the woman's dress. When the picture is substantially built up, a sheet of thin light blue paper 12 is suspended at the front. This on the whole is free from the various elements of the picture structure, but for the purpose of pronouncing certain details,—as for instance the face of the woman, this paper is securely pasted to the face portion at $12^a$. In this illustration the sheets of paper representing certain parts of the woman's face are all pasted together and pasted to the glass. Other face portions making other portions of her head and face are not so connected. For the purpose of protecting the completed picture, a glass 13 is shown at the front. The presence of this, of course, is optional. The source of artificial light is illustrated in the present instance in the form of an electric light bulb 14. The picture represents a sunrise scene, illumination for which is afforded partly by interposing certain colored papers between the source of light and various portions of the picture. These may be supported in some convenient manner. In the illustration a sheet of red paper 15 and a sheet of yellow paper 16 are shown carried by the lamp bulb. The light from which is permitted to pass through rents 17 in some of the sheets of paper forming the picture so that they come over the horizon. The man in the picture is shown leaning forward and his shirt, just above the belt, as hanging away from his body, and is in such a position that the light coming over the hills shines upon him at 18. This appearance is produced also by making certain holes or openings in some of the sheets of paper, and the light and shadow effects are enhanced in the manner above mentioned of having portions of the paper loose and portions of it fast to its support. Tears 19 in the sheet forming the man's trousers also permit the passage of the light in such a manner as to indicate the light shining upon him. The tears 20 in the paper forming the woman's skirt are also for producing a similar effect. The distant hill 20 is built up of a number of sheets of paper applied in the manner already indicated. The clouds are simulated by the sheets 21, 22 and 23, so carried by the support 1 that they extend from the same and unevenly obstruct the light.

In one aspect this is a discovery of a new method of employing a new medium with which to paint pictures. Prior to my invention various mediums have been used for this purpose. I introduce the use of white and colored paper, thick or thin. The paper is used as paint would be, by mixing it with paste and putting it on in thin or thick masses, or layers, sometimes modeling these by hand as one would clay; or stretching very thin sheets over the surfaces, either singly or one over the other, sometimes with varying space between the sheets to produce atmosphere. Everywhere the light comes through the varying thicknesses of paper, in more or less volume, depending of course upon the thickness; whereas the painter has to endeavor to paint a representation of light, by this process the light being real produces far more beautiful effects than can be obtained by trying to imitate light. This medium is thus employed in a novel manner as a pigment is in painting.

This application is filed as a continuation of my application, Serial No. 800,551, filed November 12, 1913, for "Method of producing artistic representations", in so far as the two applications contain or relate to subject matter common to both.

What I claim is:

1. The method of producing pictorial representations which consists in preparing the various form, light and color elements of paper or its equivalent and building these up one upon the other causing the various superposed sheets to adhere together in places and to separate one from the other in places for producing various lights and shadows of the subject depicted.

2. The method of producing pictorial representations which consists in preparing the various form, light and color elements of paper or its equivalent and building these up one upon the other causing the various superposed sheets to adhere together in places and to separate one from the other in places for producing various lights and shadows of the subject depicted and rupturing the paper in places for giving high lights.

3. The improved art or method of producing pictorial representations, which consists in providing a support previous to the passage of light rays, then modeling and applying to the support colored translucent papers in superimposed layers and masses varying in color, size, thickness and density to represent the form, outline, color, light and shadow of the subject depicted when viewed against the light.

4. The method of producing pictorial representations which consists in preparing the various form, light and color elements of paper or its equivalent in layers and masses varying in size, thickness and density and building these up one upon the other and modeling the same to depict the subject and represent its form, outline, color, light and shadow.

5. A pictorial representation comprising paper modeled and built up in layers and masses varying in size, thickness and density, and representing the form, outline, color, light and shadow of the subject depicted.

6. A pictorial representation comprising a support pervious to the passage of light rays carrying paper modeled and built up in layers and masses varying in size, thickness and density, and representing the form, outline, color, light and shadow of the subject depicted.

7. A pictorial representation comprising paper or its equivalent built up in layers and masses varying in size, thickness and density, some of the sheets adhering together in places, and being separated one from the other in places thereby producing various lights and shadows of the subject depicted.

8. A pictorial representation comprising paper or its equivalent built up in layers and masses varying in size, thickness and density, some of the sheets adhering together in places, and being separated one from the other in places thereby producing various lights and shadows of the subject depicted and the papers being ruptured in places thereby producing high lights.

In witness whereof, I have hereunto signed my name in the presence of a subscribing witness.

WILLIAM C. CORNWELL.

Witness:
CHAS. LYON RUSSELL.